United States Patent Office 3,425,641
Patented Feb. 4, 1969

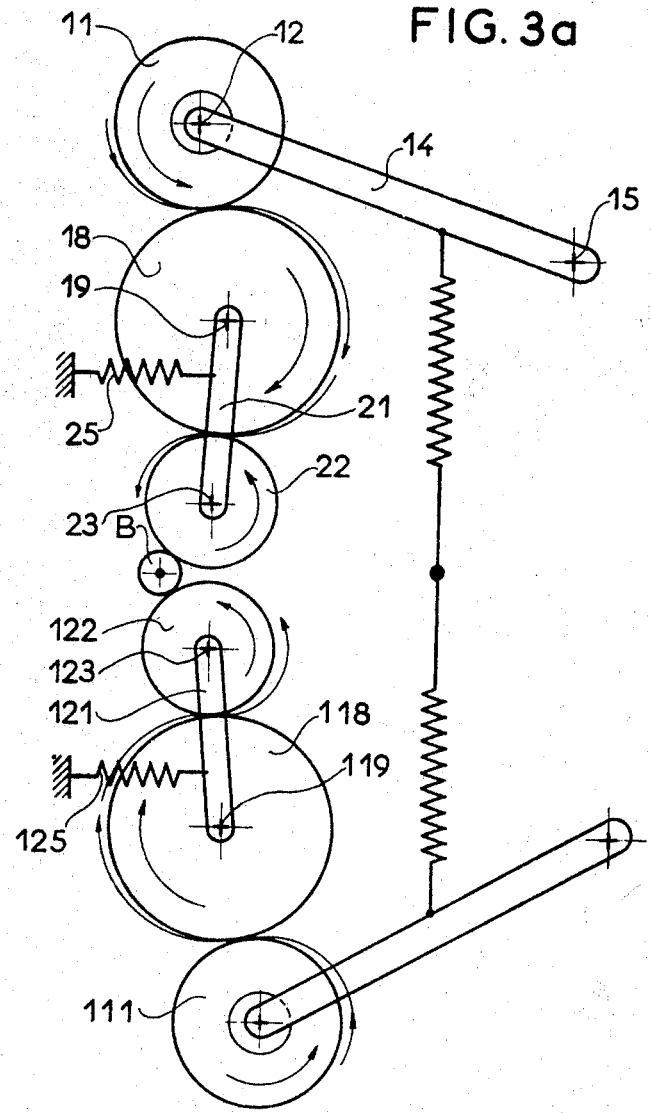

3,425,641
CAPACITOR WINDING APPARATUS
Georges Gallet, La Celle-Saint-Cloud, and Claude Guenel, Orsay, France, assignors to Compagnie Generale d'Electricite, Paris, France
Filed Oct. 25, 1966, Ser. No. 589,352
Claims priority, application France, Oct. 25, 1965, 36,130
U.S. Cl. 242—56.1
Int. Cl. B65h 17/08, 39/16
25 Claims

ABSTRACT OF THE DISCLOSURE

An electric capacitor winding machine wherein band transfer means for supporting the thin band at all points between the contact line of the band and the winding spindle, and the contact line of the band with the band supply reel is provided which comprises a mandrel rotatably mounted about a fixed shaft with an arm pivotally mounted on the shaft of the transfer mandrel, and a roller mounted on the arm; the diameter of the roller and the length of the arm between the axis of the transfer mandrel and the roller being such that the roller is constantly tangent to the transfer mandrel and to the spindle through the layer of band wound upon the winding spindle.

Background of the invention

Special precautions must be taken when handling very thin bands, especially those of a synthetic material on which an electrically conductive layer, also very thin, has already been deposited; the thickness of this type of band may be well below five microns. Such precautions are all the more necessary since these machines are to be operated at relatively high speeds.

Two sorts of defects are apparent when machines of a type known to prior art operate at high speed; pleating i.e., the forming the longitudinal furrows on the band, and folding, i.e., the forming of transversal furrows in the latter.

Summary of the invention

One object of the present invention is the provision of an aparatus enabling one or more very fragile bands, the thickness of which may be a few microns to be wound onto a spindle; the said apparatus not having the defects of devices known to prior art, especially with regard to the pleating and folding of the band.

Another object of the present invention is to provide an apparatus enabling very thin and fragile bands to be wound, with a high reliability of operation.

Another object of the present invention is to provide a machine enabling very thin, fragile and long bands to be wound in the form of an extremely homogeneously and regularly wound coil.

Another object of the present invention is to provide an apparatus of the type described above, which would have a high operational flexibility and in which the replacement of empty band-supply reels by full reels would take place without having to make any more delicate and complex adjustments.

Another object of the invention is to provide an apparatus enabling the successive manufacture of more than one coil from the same band-supply reels without having to make any more delicate and complex adjustments each time a terminated winding is discharged from its spindle or each time the spindle on which the winding takes place is changed.

Another object of the invention is to provide an apparatus enabling the manufacture of very high quality wire-wound capacitors by simultaneous winding on the same portion of spindle several thin bands made of dielectric material covered with a thin layer of electrically conductive material.

Another object of the present invention is to provide an apparatus of the type described above, which would enable easy and reliable adjustment and which could easily be adapted for use of bands of different types.

Another object of the present invention is to provide an apparatus of the type described above, able to use band-supply reels which possibly have defects, such as irregular winding of the band.

Another object of the present invention is to construct an apparatus of the type described above, capable of operating reliably at relatively high speed, i.e., 2000 or 3000 r.p.m.

Another object of the present invention is to construct an apparatus of the type described above adaptable for the entirely automatic manufacture of coils of thin bands, and, more particularly, of wound type capacitors.

As stated above, the devices known to date have the defect of allowing certain faults, such as pleating and folding, to exist in certain cases, particularly at high speed. It has been possible to prove, by the study of these phenomena, that the appearing of longitudinal furrows (pleating) may be due to various causes such as the heterogeneity of the section of band, the presence of portions of the band having unequal tension resistance qualities, or else the irregularity of the tension effort exerted on the band at certain moments and at certain places of the apparatus effecting the winding. In existing machines, this defect appears in particular when lengths of band are left free between two successive supports. Once a band is pleated it does not generally flatten out, and longitudinal furrows are found on the finished coil. Now furrows of this kind are indeed prohibitory defects in the required product, in particular where capacitors are concerned.

One of the features of the apparatus according to the invention is that, from the band supply reel to the spindle onto which the band is wound, there is not a single portion of band left free that is not supported by a mandrel, roller or similar guide means.

Folding is caused by accidental crushing of the band during winding, the said crushing taking place on the tangency line between two rollers placed one against the other. The portion of band crushed upstream of the tangency line is stretched. This causes an increase in its length upstream of the roller, whence a corresponding increase in the linear speed of this portion of band, whereas, after the said tangency line, the speed of the band remains unaltered; the band thus reaches the tangency line of a roller at a speed greater than that at which the same band travels after the said tangency line. Thus transversal folds appear and, as before, the formation of such folds is a prohibitory defect for the product being obtained, particularly where capacitors are concerned.

In known machines, the accidental crushing mentioned above is above all caused by the fact that the reels, whether they be the band-supply reels or transfer reels, are generally placed on the ends of pivoting arms such that the reels tend to exert pressures on one another, pressures which may vary through time. This is felt particularly when the pressure variation acting on the surface of the first transfer reel which rests directly on the supply reel.

Since the diameter of the latter is decreasing as it unrolls, the pressure on its tangency line with the transfer reel also varies, the supporting arm of the latter reel continuously altering its angle.

Another important feature of the apparatus according to the invention lies in the fact that the greater proportion of the mandrels and rollers forming a transfer device supporting the band between the supply reels and the winding spindle are placed on balanced arms, which enables the pressures exerted by these elements upon one another to be precisely determined and even eliminated, thus eliminating pressure variations harmful to the correct working of the apparatus.

*Brief description of the drawing*

Other aims, particularities and advantages of the invention will become evident from the following description in connection with the attached drawings illustrating several embodiments of the invention, these drawings being given here merely as examples of possible practical constructions of the machine of the invention, wherein like reference numerals are used to designate corresponding parts in the various embodiments and figures.

In these drawings:

FIGURES 3a and 3b are schematic views which illustrate another variant of the devices in FIGURES 1a and 1b;

FIGURE 11 is a schematic view which shows the way of attaching the two bands, lower and upper, onto the spindle of the machine according to FIGURES 8 and 10.

*Detailed description of the drawing*

Figure 1A:
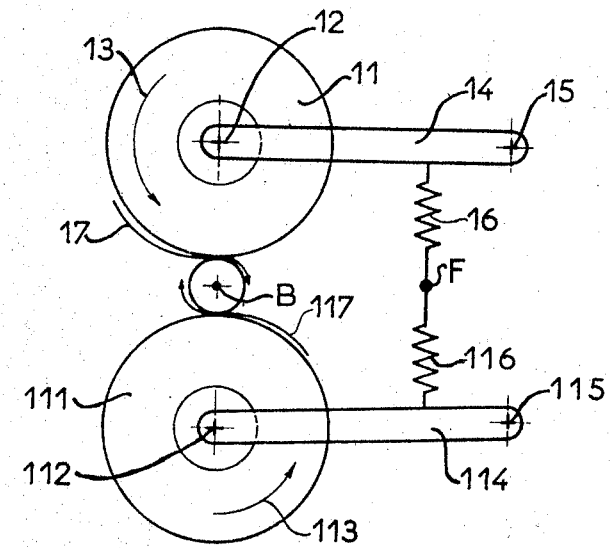
FIGURES 1a and 1b are a schematical representation of a very simplified embodiment of the present invention.

The device according to FIGURE 1a, the simplest of all, comprises no intermediary winding surface; a single spindle B receives the bands 17 and 117 directly from the two delivering reels 11 and 111 respectively. Arms 14 and 114 support the shafts 12 and 112 respectively of the said delivering reels, the ends of said arms pivoting on the two fixed shafts 15 and 115 respectively. Arrows 13 and 113 indicate the direction of rotation of the delivering reels under the action of the spindle B, which is driven around by conventional driving means not shown in the figure. Return means, such as springs 16 and 116, maintain the delivering reels 11 and 111 pressed tightly against the spindle B; these means are illustrated here by return springs made fast to a single fixed point F, but may also consist of weights or balance-weights, or any other known equivalent means. The delivering reels 11 and 111 move further apart as the diameter of the winding forming on the spindle B increases; this separation taking place in opposition to the respective return forces of the springs 16 and 116.

Figure 1B:
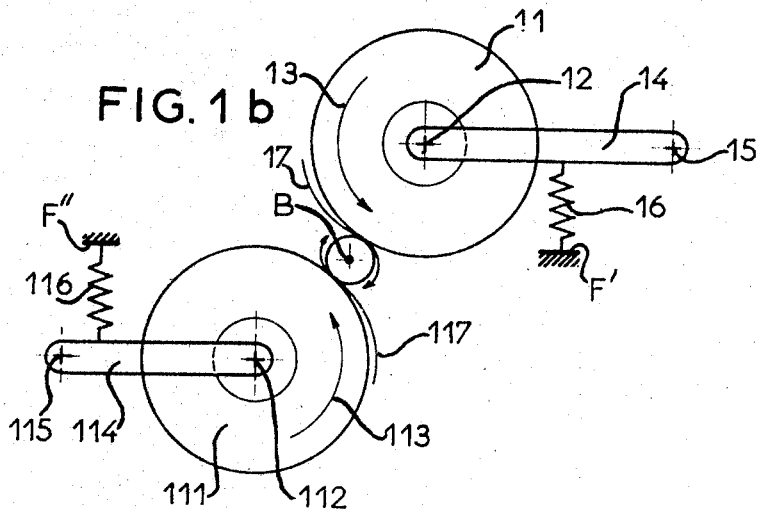

FIGURE 1b shows a variant of the device illustrated in FIGURE 1a. In FIGURE 1b, the springs 16 and 116 are made fast to different fixed points F' and F", whereas the arms 16 and 116 are placed on either side of the plane defined by the shafts 12 and 112.

In the case of an apparatus adapted for winding a single band on one spindle, all one needs to do is to remove the unit consisting of elements 111, 112, 114 and 116 from FIGURE 1b.

In the device shown in FIGURES 1a and 1b, pleating is avoided by preventing any part of the band from being unsupported by a mandrel. However, the device does not solve satisfactorily the problems of the crushing of the band between reels such as 11 and the spindle, and this may have very disastrous consequences, in the case where the delivering reel 11 has winding defects of some kind or other.

Figure 2A:
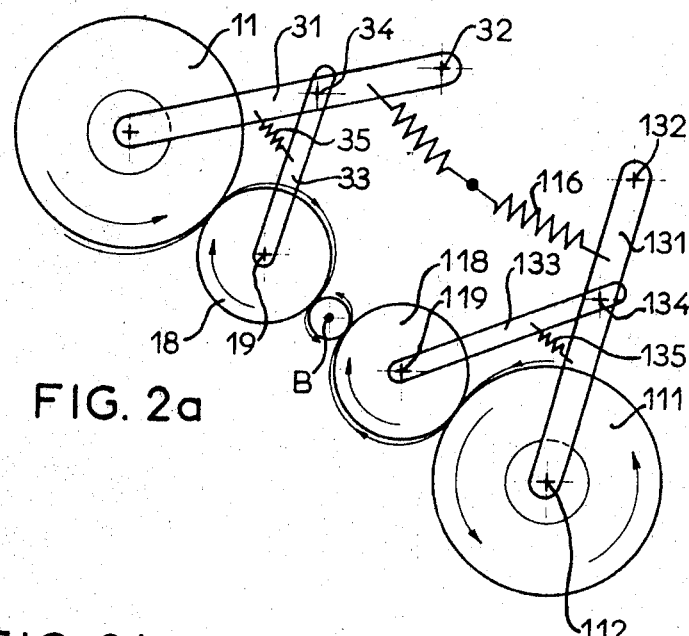
FIGURES 2a and 2b are schematic views which illustrate two variants of the devices in FIGURES 1a and 1b.
Figure 2B:
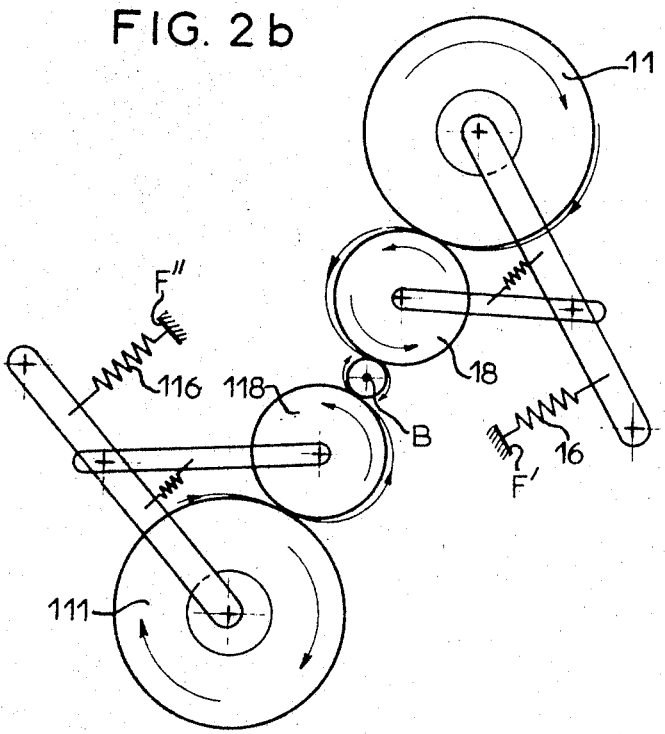

FIGURES 2a and 2b illustrate a variant of the devices of FIGURES 1a and 1b, respectively. The devices in FIGURES 2a and 2b placed between the spindle B and the delivering reels 11 and 111 respectively, comprise two mandrels 18 and 118, called hereinafter transfer mandrels. Mandrels 18 and 118 are assembled pivoting freely on the respective shafts 19 and 119, fixed on the ends of the respective arms 33 and 133 which pivot on shafts 34 and 134, which are fixed to arms 31 and 131 holding the reels 11 and 111 respectively. The arms 31 and 131 pivot respectively on the two fixed shafts 32 and 132. Return means such as springs 35 and 135 bias rollers 18 and 118 respectively to the reels 11 and 111.

According to a variant not illustrated in this figure, shafts 34 and 134 may be the same as shafts 32 and 132 respectively.

FIGURE 2b shows another possible arrangement of the elements illustrated in FIGURE 2a. As before, a machine enabling a single band to be wound may be obtained by removing one of the unwinding devices. In the device according to FIGURES 2a and 2b the presence of the transfer mandrel 18 improves the solution of the folding problem, but does not solve it entirely due to the fact that the action of the springs may cause the band to be accidentally crushed.

Figure 3B:
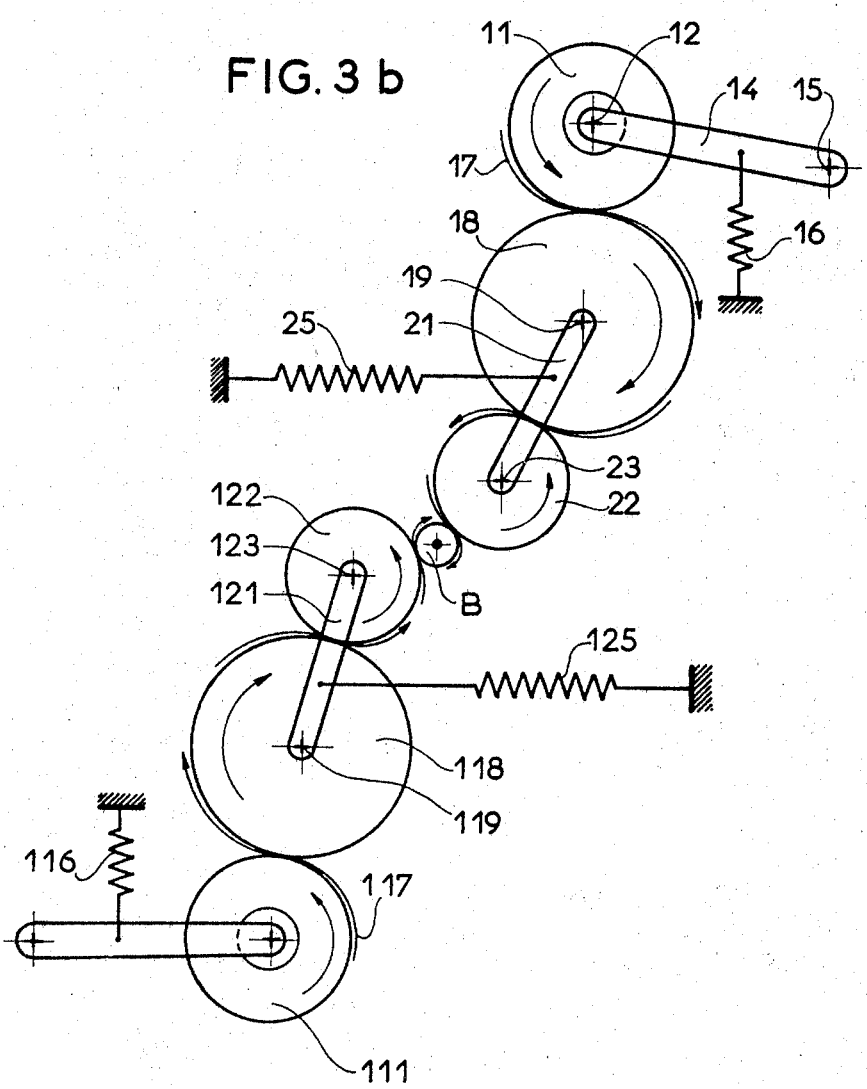

Other variants of the device according to the invention are illustrated by FIGURES 3a and 3b. The shafts 19 and 119 of the transfer mandrels 18 and 118 are fixed. These shafts also act as pivots for arms 21 and 121 respectively, at the ends of which shafts 23 and 123 are fixed. Two guide rollers 22 and 122 are mounted for free rotation about these shafts 23 and 123. Return means, such as springs 25 and 125 hold the guide rollers 22 and 122 in position, the latter resting on the spindle B. According to an embodiment not illustrated in FIGURES 3a and 3b, the return springs 25 and 125 are replaced by balance weights which enable either a static balance or the creation of a return pressure varying with the position of this balance weight with regard to the shaft 19.

As before, a machine enabling a single band to be wound may be obtained by removing one of the unwinding devices. In the device according to FIGURES 3a and 3b, the addition of an extra roller with a fixed shaft removes the possible influence of the spring 16 on the spindle B, but in spite of this the band may be damaged by crushing between 11 and 18 and between B and 22.

According to a variant (not shown) of the embodiment in FIGURES 3a and 3b, the delivering reel 11 is placed on a shaft fixed on the end of an arm which pivots on a fixed shaft and which is extended beyond the fixed shaft away from the reel 11 by a rod on which a balance weight slides. The adjustment of the position of the balance weight on this rod enables the arm holding the reel 11 to be balanced so that it will not exert any pressure on the fixed shaft mandrel 18. For example, the fixed shaft on which the arm holding the reel 11 pivots could have sufficient length and be placed substantially above the fixed shaft of the mandrel 18; this has the advantages of minimizing the effect on the mandrel 18 of the variation in weight of the reel 11, as the latter unwinds, this variation in weight progressively destroying the balance obtained when the reel was full. It is thus shown that this variant of the device has drawbacks due to the variation in weight of the reel 11. It is contemplated that the above analysis may be applied to reel 111.

Figure 4:
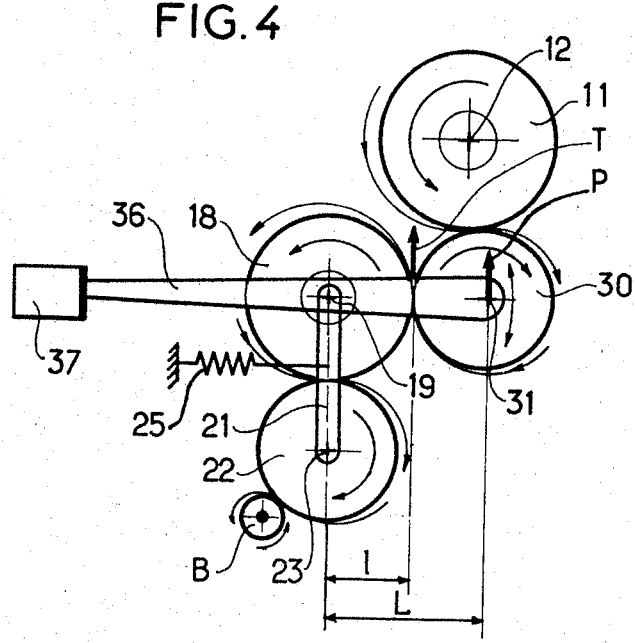
FIGURE 4 is a diagram showing a variant of a part of a device according to the invention.

This disadvantage is completely removed in the case of the variant shown in FIGURE 4, showing a transfer mandrel 18 and the spindle B which are, as in the case of FIGURES 3a and 3b, mounted on fixed shafts, but comprising a delivering reel mounted on a shaft 12 also fixed, whereas a mandrel 30 on a mobile shaft is placed between the reel 11 and the mandrel 18.

This mandrel 30 is tangent both to the delivering reel 11 and to the transfer mandrel 18, and is mounted on a shaft 31 capable of a pivoting movement on the fixed axis 19 which is parallel to it. To this end, the shaft 31 is fixed to this end of one of the arms of the lever 36, at the end of the other arm of which is fixed a balance weight 37, whose position may be adjusted in such a way that the whole unit comprising the lever 36, the mandrel 30 and the balance weight 37 be balanced whatever the angle of the said arm 36. The mandrel 30 thus balanced exerts no pressure on the delivering reel 11, except that resulting from the tension effort exerted by the spindle B on the band during unwinding.

Let T be the force which is exerted on the band at the moment when the latter leaves the balanced mandrel 30, and let P be the resultant pressure exerted by the balanced mandrel on the delivering reel. The respective lever arms, with regard to the shaft 19, being 1 and L, we have the following equation:

$$T = PL/1$$

and L being greater than 1, we deduce that T is greater than P.

Thus, the evacuation of the band downstream from the balanced mandrel takes place under the action of a force superior to that which exists upstream of the said balanced mandrel and the folding effect is thus totally removed. This result is obtained whatever the position in space of the balanced mandrel, i.e., independent of the quantity of band already having left the delivering reel.

The guide roller 22 is mounted on a shaft 23 fixed on an arm 21 pivoting on the fixed shaft 19. The arm 21 is returned, by an appropriate means, such as the spring 25, in the right direction so that the guide roller 22 may be held constantly against the winding surface of the spindle B. A return spring, such as 25, has a certain number of advantages. In particular, it enables a return pressure to be obtained without altering the inertia of the mobile fitment formed by the arm 21 and the guide roller 22.

Figure 9:
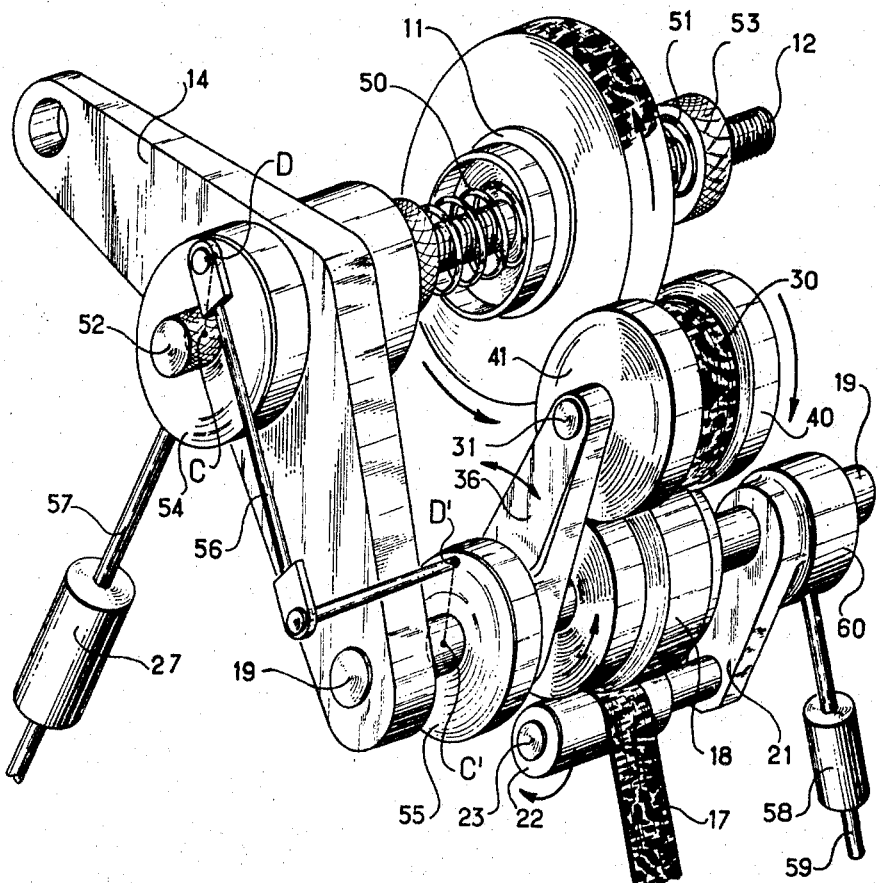
FIGURE 9 is a schematic view which shows the unwinding system of the upper band of the machine according to FIGURE 8.

According to a variant illustrated in FIGURE 9, the guide roller 22 is also returned to position by a balance weight replacing the spring 25 of FIGURE 4.

The use of a balance weight is advantageous in that it enables very fine adjustment of the pressure exerted by the roller 22 on the spindle B and even, in the end enables a balance to be obtained, the pressure only being created by the tension of the band. However, the balance weight increases the inertia of the fitment formed by 22 and B, which may constitute a drawback, for if the spindle B turns very fast and if it has a small diameter, unevenness in the surface of the wire-wound capacitor would tend to produce an oscillating movement of the roller 22; in the case of the inertia of the roller 22 being very great, this oscillating movement will result in variations in pressure on the spindle, unfavorable to the correct operation of the machine.

Figure 5:
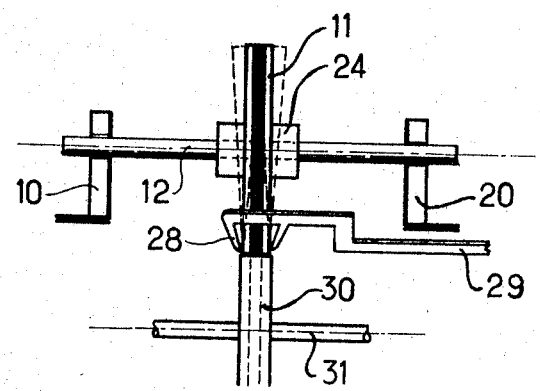
FIGURES 5, 6 and 7 are schematic views which show three different band-guiding devices, which may be used in a device according to the invention.

FIGURE 5 illustrates an embodiment of a band guiding device. A fork 28, fixed on the end of an arm 29, clamps onto both sides of the circumference of the supply reel 11 which is mounted on a hub 24, itself borne by the shaft 12. The shaft 12 is mounted on bearings 10 and 20 enabling this shaft to be axially displaced. It is then obvious that, if the band wound on the reel buckles, this happening will immediately be compensated for, as the unit 11–24–12 is axially displaced in the appropriate direction, the band thus winding correctly onto the mandrel 30. The variant according to FIGURE 5 thus enables the use of supply reels having unwinding defects. It is contemplated that this guiding device may be used in any of the present embodiments.

Figure 6:
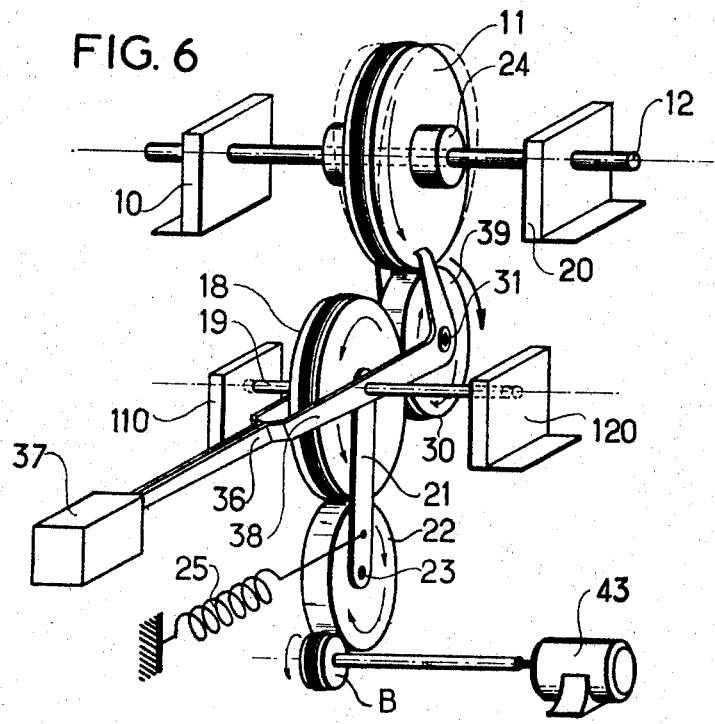

FIGURE 6 is a perspective view of a variant of production of the device shown in FIGURES 4 and 5. Here the guiding of the band takes place with the aid of a fork 39 obtained by extending and bending the two branches 38 of the arm 36, the said fork 39 having the same function as the fork 28 of FIGURE 5. 110 and 120 denote the bearings holding the fixed shaft 19 of the transfer mandrel 18, whereas a motor driving the spindle B is shown at 43.

Figure 7:
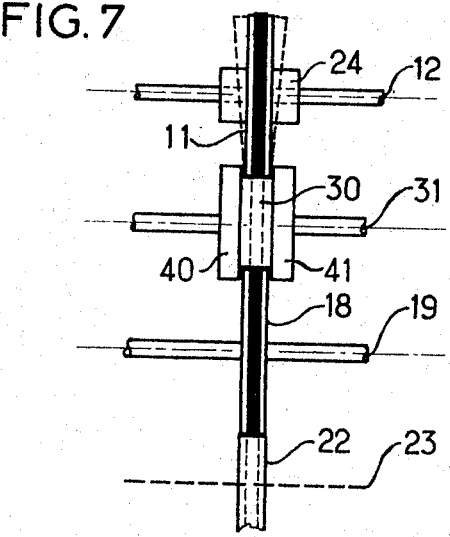

FIGURE 7 illustrates another variant in the provision of the guiding device for the band. In this variant, the balanced mandrel 30 comprises two lateral flanges 40 and 41 which clamp down the band and fulfill the same function as the fork 24 of FIGURE 5 and of the fork 39 of FIGURE 6. It is contemplated that this guiding device may be used in any of the present embodiments.

Figure 8:
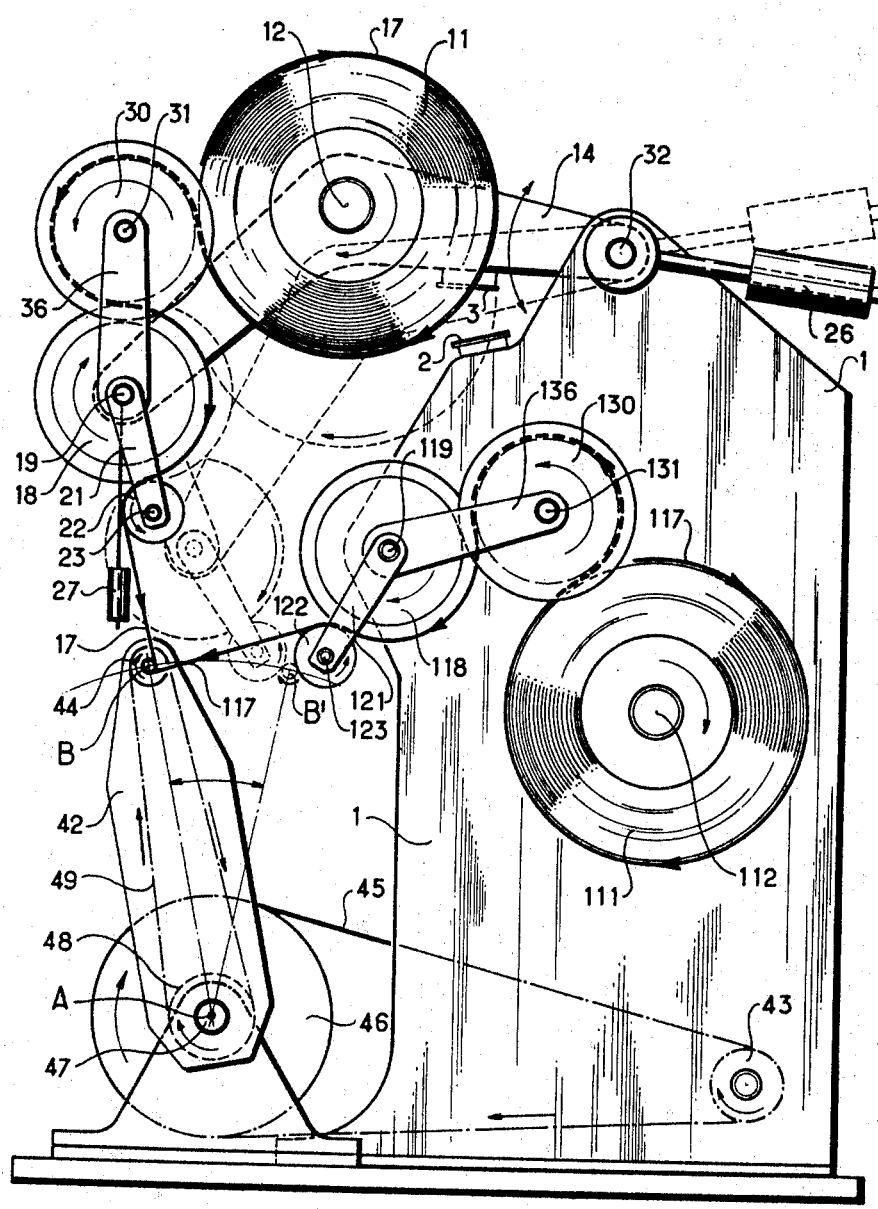
FIGURE 8 is a front view of an embodiment of a winding machine according to this invention.

FIGURE 8 is a view in elevation of an entire winding machine forming a particular embodiment of the invention. In the example shown in FIGURE 8, the machine is intended to wind, simultaneously, two bands 17 and 117 onto the same spindle B. A frame 1 supports a horizontal fixed shaft 32 on which a bent arm 14 pivots. A balance weight 26 enables the bent arm 14 to be balanced in any position. This arm 14 bears, directly or indirectly, all the unwinding mechanism of the first band 17. The pivoting of the arm 14 on the shaft 32 enables the machine to be opened to give access to the spindle B as shown in the solid lines. The latter is mounted on arms 42, which enables it to be separated as shown in the solid lines from its working position, B' as shown in dotted lines with a view to fit on the two bands by hand at the beginning of each operation or to remove the coil produced, at the end of the said operation.

A magnetic locking device, comprising for example, a fixed magnet 2 forming part of the frame 1 and a mobile magnet 3 borne by the arm 14, enables the precise locking of the arm 14 in the working position as shown in dotted lines.

The supply reel 11 turns freely on the shaft 12 supported by the arm 14. A mandrel 30 is mounted on the shaft 31 fixed on the end of an arm 36 which is pivotally mounted on the shaft 19 borne by the free end of the bent arm 14. A balance weight, shown diagrammatically by 27 in FIGURE 8, balances the arm 36 in any position. Being balanced, the mandrel 30 is only pressed against the supply reel 11, to which it is a tangent, by the effect of the tension exterted on the band by the spindle B. A transfer mandrel 18, tangent to the balanced mandrel 30, turns on the same shaft 19 fixed on the free end of the arm 14. An arm 21 also pivots on the shaft 19 and supports, on its free end, a shaft 23 on which a guide roller 22 turns, tangent to the transfer mandrel 18. The band leaves the guide roller after running over part of its surface, and is wound onto the spindle B to which the guide roller 22 becomes a tangent when the arm 14 is bent back into working position as shown in FIGURE 8 by dotted lines. The arm 21 also comprises a return means, for example, a balance weight, creating a pressure by roller 22 on the spindle B, a pressure necessary in the case of FIGURE 8 to prevent the tension effort exerted by the band 117 from separating the roller 22 from the spindle B. The details of the device will be described with greater precision with reference to FIGURE 9.

A second mechanism similar to the first and comprising a supply reel 111, a balanced mandrel 130, a transfer mandrel 118 and guide roller 122 enables the supplying of the second band 117 which winds onto the same spindle B.

In a first embodiment, not shown in the figures, elements 111–112, 130–131, 136, 118–119, 121 and 122 may be mounted on a pivoting arm, identical with the arm 14. However, the use of a second arm such as 14 is not necessary for the pivoting arm 14 is essentially used for opening the machine for maintenance or charging and does not intervene for the adjustment of the pressure of the guide rollers 22 and 122; indeed, as illustrated in FIG- URES 9 and 10, the guide roller 22 acts in connection with a balance weight 58 which may act as balancing or pressure means, whereas the roller 122 acts in connection with a balance weight 158 which must, in the case of this figure, press this roller 122 against the spindle B.

In the embodiment shown in FIGURE 8, the shafts 112 and 119 are mounted in a fixed way with regard to the frame 1 whereas the arms 136 and 121 are mounted pivoting on the fixed axis 119 in a similar way to that of the arms 36 and 21 which are mounted pivoting on the shaft 19.

Figure 10:
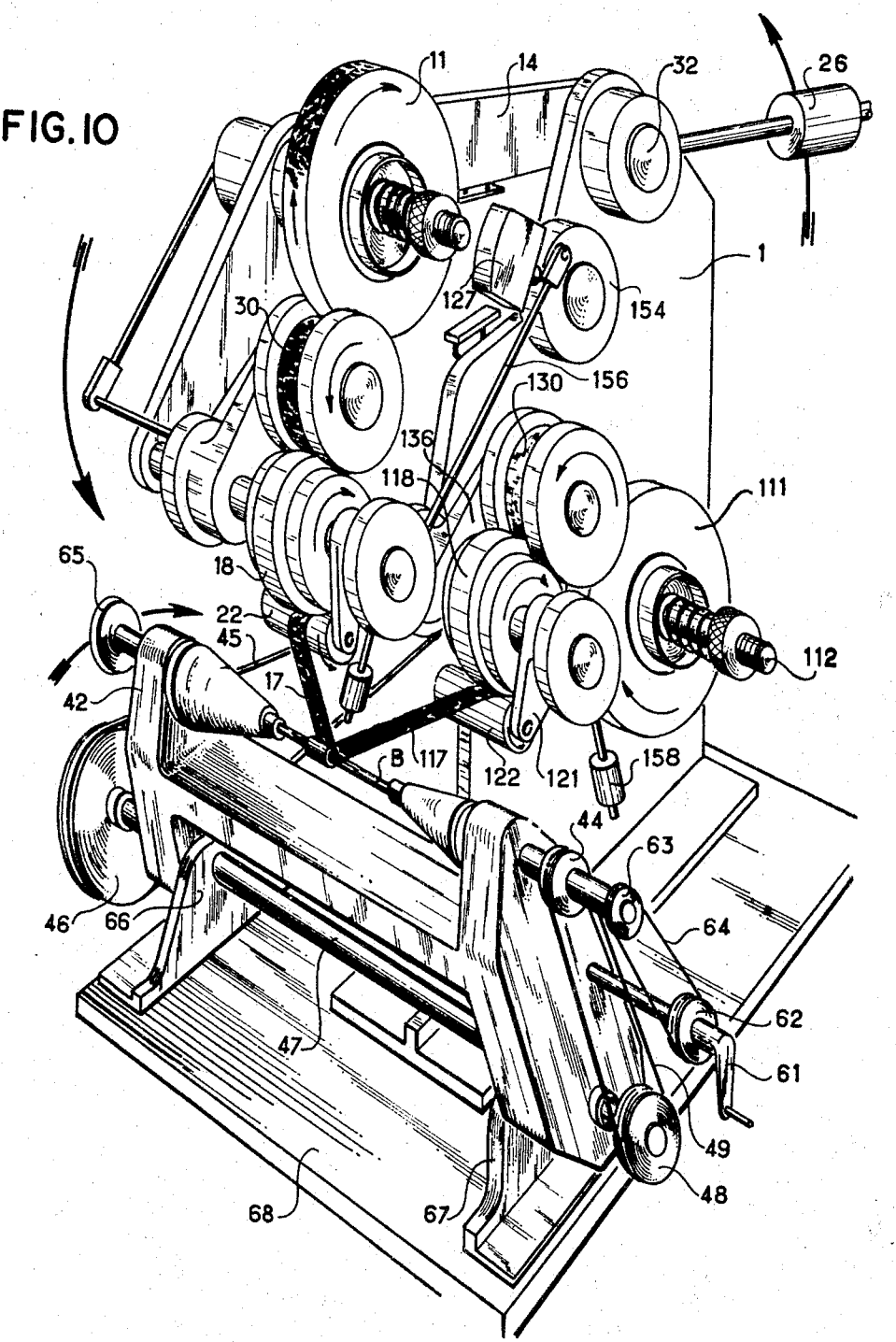
FIGURE 10 is a perspective view of the complete machine according to FIGURE 8.

This is illustrated by the perspective view of FIGURE 10 in which it may be seen that the balance of the arm 136 is obtained by a crank-rod system 156–154 transmitting a force exerted by a balance weight 127.

The spindle B is driven by a motor 43 acting on the transmission system formed by the belt 45, the pulley 46–48, the belt 49 and the pulley 44.

The spindle B is held up by a pivoting frame 42 which will be described below and the shafts A, B of which, shown here in the open position, is brought to the working position A, B'.

FIGURE 9 shows, in perspective, a production detail of the unwinding mechanism of the first band 17. The references of the parts are the same as those of FIGURE 8. So as to give sufficient tension, the hub of the supply reel 11 is slowed down by two spiral springs 50 and 51, placed coaxially with the shaft 12, the required braking pressure being obtained by the combined action of two knurled threaded buttons 52 and 53, screwing onto the shaft 12 threaded for that purpose.

A balance weight 27, instead of being attached directly to the arm 36, has been shifted so as to be supported by the disc 54, pivoting freely on the shaft 12. A disc 55 forms part of the arm 36 and pivots freely, with the latter on the shaft 19. A rod 56 joins the two discs 54 and 55 together, the corresponding crank arms, equal and parallel to each other, being situated respectively at C–D, C'–D'. The shaft of the bar 57, along which the balance weight 27 is shifted for adjustment purposes, is itself parallel to the axis of symmetry of the arm 36.

The transfer mandrel 18 passes through the two flanges 40 and 41 of the mandrel 30 and comprises two cylindrical lateral parts, tangent to the said flanges 40 and 41, these two pairs of elements rolling permanently one upon the other.

In the working position, slight pressure may be exerted by the guide roller 22 on the spindle B. To this end, a balance weight 58, which may be dispaced on a rod 59, is fixed on a disc 60 forming part of the arm 21 and pivoting freely on the shaft 19.

FIGURE 10 is a perspective view of the complete machine, where, in particular, constructional details of the spindle-carrying pivoting frame 42 have been shown. The shaft 47 which goes right through this frame 42 acts as a rotation shaft, transmitting the rotary movement coming from the motor 43 (not shown in the diagram) to the spindle, by means of the belt 45, the pulley 46, and pulleys 48 and 44 connected by the belt 49. A manual control device, for example, a crank 61, enables the shaft of the spindle to be directly rotated by means of pulleys 62 and 63, connected together by the belt 64. This manual control device may be put out of gear automatically when the spindle is driven by the motor by a conventional device not shown in the figures.

A wheel 65 enables the semi-spindle situated on the left of the figure to be drawn in this direction, so as to place the two bands conveniently between the two semi-spindles, at the beginning of each operation, as will later be explained with reference to FIGURE 11.

The shaft 47 acts furthermore as a pivoting shaft for the spindle-carrying frame 42, so that the frame 42 may be pivoted from its working position to its open position or pivoted back into its working position, tangent to the guide roller 122. Two brackets 66 and 67, fixed onto the general base 68 of the machine, hold up the two bearings (not shown) of the shaft 47.

Lastly, FIGURE 11 shows a cross-section of the spindle B according to a preferred embodiment of the invention; this spindle is formed of two semi-spindles $B_1$ and $B_2$, which may be separated from one another in the axial direction. It is obvious from FIGURE 10 that by manipulating the wheel 65, it is possible to shift, axially, the semi-spindle corresponding for example to the semi-spindle $B_1$ of FIGURE 11. The two bands are then placed against the flat surface of the remaining semi-spindle $B_2$, the semi-spindle $B_1$ is then put into place and the unit is ready to begin winding.

According to a preferred way of operating, the bands are arranged slightly offset in the axial direction of the spindle so as to enable the subsequent welding of the electrodes of the capacitor thus formed.

According to a variant not shown in the figures, a multiple-spindle device may also be adapted to this use: at the end of the winding of a capacitor the first spindle is separated while a second is put into place; then it is only necessary to cut the band between the two spindles, the second spindle already turning while the capacitor obtained on the first is finished off, then removed. This enables the complete automation of coil production, and especially the production of capacitors.

Finally, it must be mentioned that more than one unwinding device of the type described above, may be joined together to obtain simultaneous winding of two or more bands, placed one on top of the other on one and the same spindle.

The number of unwinding devices is only limited by the need to have the required number of guide rollers such as 22 and 122 tangent to the coil formed on the spindle.

The above embodiments and modifications have been shown and described only as examples of the broader aspects of the present invention, and other embodiments and modifications are contemplated within the spirit and scope of the invention as defined by the following claims.

We claim:

1. A machine for winding a very thin and fragile band, comprising: a winding spindle; a band-supply reel; and band-transfer means for supporting said band at all points between the contact line of the band and said winding spindle, and the contact line of the band with said band-supply reel; said band-transfer means comprising a transfer mandrel rotatably mounted about a fixed shaft, an arm pivoting on the shaft of said transfer mandrel, and a roller mounted on said arm, the diameter of said roller and the length of said arm between the axes of said transfer mandrel and roller being such that said roller is constantly tangent to said transfer mandrel and to said spindle through the layer of band wound onto said winding spindle.

2. The winding machine according to claim 1 further comprising return means for holding said roller in position against said winding spindle.

3. The winding machine according to claim 1, comprising in addition balancing and return means for holding said roller in position against said spindle, being adjustable to an adjustment position where the pressure of said roller against said spindle is zero whatever the distance between the shaft of said roller and the shaft of said spindle as determined by the thickness of the wound band.

4. The winding machine according to claim 1, comprising means for balancing and returning said roller formed by a rod connected mechanically to the arm supporting the shaft of said roller, and a balance weight adjustably mounted on said rod.

5. The winding machine according to claim 1, including an arm pivotally mounted about a fixed axis, said supply reel being pivotally mounted on said arm spaced from the fixed axis.

6. The winding machine according to claim 5 in which said supply reel is held in tangency with said transfer mandrel by means of its own weight.

7. Winding machine according to claim 5 including return means acting on the arm on which said supply reel is mounted for holding said supply reel in tangency with said transfer mandrel.

8. The winding machine according to claim 5, in which the arm on which said reel is mounted comprises an extension, and a weight displaceably mounted on the unit formed by the arm and its extension to constitute means for adjusting the pressure exerted by said reel on said transfer mandrel.

9. Winding machine according to claim 1, including braking means associated with said supply reel for regulating the winding tension of the band.

10. For use in a machine for winding a thin, fragile band, a transfer means capable of supporting said band on its entire length between the contact line of said band with a band-supply reel of the machine and the contact line of said band with a winding spindle of the machine comprising: a transfer mandrel having a fixed axis of rotation; an arm pivoting about the axis of said transfer mandrel; a roller pivotally mounted on said arm; the diameter of said roller and the length of said arm between the axis of said transfer mandrels and roller being such that said roller is at all times of operation tangent to said transfer mandrel through said band; and an intermediate mandrel, mounted on a mobile of a second arm, pivotally mounted about the axis of said transfer mandrel; an intermediate mandrel rotatably mounted on said second arm, the length of the second arm between said intermediate mandrel and said transfer mandrel axis and the diameter of said intermediate mandrel being such that the latter is tangent to the transfer mandrel through said band.

11. The winding machine according to claim 10, comprising a supply reel mounted on a shaft parallel to and at a constant distance from the axis of said transfer mandrel; said transfer mandrel being tangent to said reel; said roller being tangent to said spindle through the layer of band wound onto it.

12. The winding machine according to claim 11, in which said second arm includes adjustable return and balancing means having an adjustment position for which the pressure of said intermediate mandrel on said supply reel is zero.

13. The winding machine according to claim 11, in which said second arm includes a rod extending it beyond the axis of said transfer mandrel and a balance weight adjustably mounted along said extending rod.

14. The winding machine according to claim 11, in which said supply reel is mounted by means enabling axial shifting of said supply reel; guiding means to hold the circumference contact portion of the supply reel in an axial fixed position with respect to the axial center of said intermediate mandrel.

15. The winding machine according to claim 14, in which said guiding means comprises a fork pressing on the edges of the faces of said supply reel.

16. The winding machine according to claim 15, wherein said fork is formed by bent extensions of the branches of a second fork forming the arm that supports said intermediate mandrel.

17. The winding machine according to claim 14, in which said guiding means is formed by two flanges placed respectively on the faces of the intermediate mandrel.

18. The winding machine according to claim 10, further comprising return means for holding said roller in position against said spindle.

19. The winding machine according to claim 10, further comprising balancing and return means for holding said roller against said spindle, said balancing and return means being adjustable and having an adjustment position for which the pressure of said roller on said spindle is zero whatever the distance between the axis of said roller and the axis of said spindle.

20. The winding machine according to claim 10, comprising balancing and return means formed by a rod connected mechanically to the arm supporting said shaft of said roller and a balance weight adjustably mounted on said rod.

21. A machine for winding thin bands, comprising: a winding spindle; driving means for rotating said spindle; a band-unwinding device having a mounting arm pivoting on a fixed axis and including a rod extension of said arm having an adjustably mounted balance weight; said unwinding device comprising a band-supply reel mounted about an axis on said arm, a transfer mandrel mounted about an axis on said arm, an intermediate mandrel, a balanced arm mounted for pivoting about the axis of said transfer mandrel; said intermediate mandrel being mounted for rotation on said balanced arm and being tangent on the one hand, to said transfer mandrel through said band, and on the one hand to said transfer mandrel through said band, and on the other hand to said supply reel, a roller rotating freely on a shaft mounted on an arm pivotally mounted on the axis of said transfer mandrel, said roller being rotatably mounted on said last mentioned arm tangent to said transfer mandrel through said band, and adjustable return and balancing means secured to the arm supporting said roller for maintaining said roller in position against said spindle at an adjustable pressure, including zero value pressure.

22. The winding machine according to claim 21, in which said arm supporting said first unwinding device comprises a locking means for locking it in a working position such that said spindle is on the trajectory of said roller.

23. The winding machine according to claim 21, in which said spindle is formed of two semi-cylindrical spindle portions held together with their flat surfaces adjacent each other by two respective spindle holders, at least one of said spindle-holders being axially displaceable in order to clear the flat surface of the other spindle thus enabling the position of the band to be wound.

24. A band-winding machine comprising: a winding spindle having rotary driving means; a first band-unwinding device including an arm pivoting on a fixed axis and having an extension rod including a displaceably mounted balancing weight; said first unwinding device comprising a band-supply reel rotatably mounted on said arm, a transfer mandrel rotatably mounted on said arm, an intermediate mandrel, a balanced arm pivotally mounted on said arm about the axis of said transfer mandrel, said intermediate mandrel being pivotally mounted on said balanced arm tangent on the one hand to said transfer mandrel through said band and on the other hand to said supply reel, a roller, an arm pivotally mounted about the axis of said transfer mandrel, said roller being pivotally mounted on said last mentioned arm tangent to said transfer mandrel through said band, an adjustable return and balancing means secured to the arm supporting said roller for holding said roller in position against said spindle at an adjustable pressure of a range including zero; a second band-unwinding device comprising a band supply reel mounted about a fixed axis, a transfer mandrel mounted about a fixed axis, an intermediate mandrel, a balanced arm pivotally mounted about the axis of said transfer mandrel, said intermediate mandrel being pivotally mounted on said balanced arm tangent on the one hand to said transfer mandrel through said band and on the other hand to said supply reel of the second unwinding device, a roller, an arm pivotally mounted about the axis of said last-mentioned transfer mandrel, said last-mentioned roller being pivotally mounted on said last-mentioned arm tangent to said last-mentioned transfer mandrel through said band, and an adjustable return and balancing means attached to the arm supporting said last-mentioned roller for holding said roller of said second unwinding device in position against said spindle at any adjustable pressure of a range including zero pressure.

25. The winding machine according to claim 24, including two arms pivotally mounted about a fixed axis, said spindle being mounted on said two arms to assume a working position in contact with said rollers of said first and second unwinding devices.

References Cited

UNITED STATES PATENTS

| | | | |
|---|---|---|---|
| 3,058,684 | 10/1962 | Wellington | 242—56.1 |
| 3,073,008 | 1/1963 | McGraw | 29—25.42 |

FOREIGN PATENTS 1,186,947   2/1965   Germany.

LEONARD D. CHRISTIAN, *Primary Examiner.*

U.S. Cl. X.R.

242—65